(12) United States Patent
Rudenko et al.

(10) Patent No.: US 11,687,084 B2
(45) Date of Patent: Jun. 27, 2023

(54) METHOD AND DEVICE FOR SOCIALLY AWARE MODEL PREDICTIVE CONTROL OF A ROBOTIC DEVICE USING MACHINE LEARNING

(71) Applicant: Robert Bosch GmbH, Stuttgart (DE)

(72) Inventors: Andrey Rudenko, Gerlingen (DE); Luigi Palmieri, Leonberg (DE); Kai Oliver Arras, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 105 days.

(21) Appl. No.: 17/388,881

(22) Filed: Jul. 29, 2021

(65) Prior Publication Data

US 2022/0050469 A1  Feb. 17, 2022

(30) Foreign Application Priority Data

Aug. 12, 2020 (EP) .................................... 20190604

(51) Int. Cl.
*G01C 22/00* (2006.01)
*G05D 1/00* (2006.01)
(Continued)

(52) U.S. Cl.
CPC .......... *G05D 1/0221* (2013.01); *B25J 9/1605* (2013.01); *B25J 9/1664* (2013.01); *B25J 9/1666* (2013.01); *G05B 13/027* (2013.01); *G05B 13/048* (2013.01); *G05D 1/0214* (2013.01); *B25J 9/163* (2013.01); *B25J 9/1676* (2013.01);
(Continued)

(58) Field of Classification Search
CPC ............... G05D 1/0221; G05D 1/0214; G05D 2201/0203; G05D 2201/0208; G05D 2201/02; G05D 1/0217; G05D 2201/0201; B25J 9/1605; B25J 9/1664; B25J 9/1666; B25J 9/163; B25J 9/1676; G05B 13/027;
(Continued)

(56) References Cited

U.S. PATENT DOCUMENTS

2016/0041536 A1* 2/2016 Benosman ........... G05B 13/048
700/31
2017/0226989 A1* 8/2017 Hammerum ............ F03D 7/045
(Continued)

OTHER PUBLICATIONS

IEEE International Conference on Robotics and Automation (ICRA), Singapore, 2017; Title: "Information theoretic MPC for Model-Based Reinforcement Learning" by ("Williams") (Year: 2017).*
(Continued)

*Primary Examiner* — Harry Y Oh
*Assistant Examiner* — Sohana Tanju Khayer
(74) *Attorney, Agent, or Firm* — Norton Rose Fulbright US LLP; Gerard Messina (57) ABSTRACT

A computer-implemented method for determining a control trajectory for a robotic device. The method includes: performing an information theoretic model predictive control applying a control trajectory sample prior in each time step to obtain a control trajectory for a given time horizon; determining the control trajectory sample prior depending on a data-driven trajectory prediction model which is trained to output a control trajectory sample as the control trajectory sample prior based on an actual state of the robotic device.

10 Claims, 3 Drawing Sheets

(51) Int. Cl.
   *G05D 1/02*      (2020.01)
   *B25J 9/16*      (2006.01)
   *G05B 13/02*     (2006.01)
   *G05B 13/04*     (2006.01)

(52) U.S. Cl.
   CPC ............... *G05D 2201/0203* (2013.01); *G05D 2201/0208* (2013.01)

(58) Field of Classification Search
   CPC ...... G05B 13/048; G06N 3/0454; G06N 3/08; G01C 21/3446
   See application file for complete search history.

(56) References Cited

U.S. PATENT DOCUMENTS

| | | | |
|---|---|---|---|
| 2018/0120843 A1* | 5/2018 | Berntorp | G06V 10/764 |
| 2018/0218262 A1* | 8/2018 | Okada | G06N 7/005 |

OTHER PUBLICATIONS

G. Williams et. al., "Information theoretic MPC for model-based reinforcement learning", International Conference on Robotics and Automation, 2017. Retrieved from the Internet on Jul. 29, 2021: https://www.cc.gatech.edu/~bboots3/files/InformationTheoreticMPC.pdf. 8 Pages.

Schoels, T. et al., "An NMPC Approach using Convex Inner Approximations for Online Motion Planning with Guaranteed Collision Freedom", arXiv preprint arXiv:1909.08267, 2019. Retrieved from the Internet on Jul. 29, 2021: https://arxiv.org/pdf/1909.08267.pdf. 9 pages.

\* cited by examiner

METHOD AND DEVICE FOR SOCIALLY AWARE MODEL PREDICTIVE CONTROL OF A ROBOTIC DEVICE USING MACHINE LEARNING

CROSS REFERENCE

The present application claims the benefit under 35 U.S.C. 119 of European Patent Application No. 20190604.7 filed on Aug. 12, 2020, which is expressly incorporated herein by reference in its entirety.

FIELD

The present invention relates to model predictive control for planning trajectories of robotic devices.

BACKGROUND INFORMATION

For autonomous control of a robotic device, motion planning is used for efficiently accomplishing navigation tasks. Based on sensor inputs, an actual state of the robotic device and its environment are determined, while trajectories or motion paths, respectively, are developed considering also dynamic obstacles such as moving objects or individuals in the environment.

In general, model predictive control (MPC) is an efficient technique which solves a receding horizon model-based open loop optimal control problem. Classical model predictive control techniques work well when the goal is the stabilization of constrained systems around equilibrium points or trajectories.

In G. Williams et. al., "Information theoretic MPC for model-based reinforcement learning", International Conference on Robotics and Automation, 2017, an information theoretic approach is described to overcome some of the natural limitations of standard MPC techniques. In contrast to standard MPC techniques, Information Theoretic Model Predictive Control (IT-MPC) can work considering arbitrary system dynamics and arbitrary nonlinear cost definitions.

SUMMARY

According to the present invention, a method for planning a trajectory, particularly for a robotic device, and a control unit and a robotic device according to the further independent claims are provided.

Further embodiments of the present invention are disclosed herein.

According to a first aspect of the present invention, a computer-implemented method for determining a control trajectory for a robotic device is provided. In accordance with an example embodiment of the present invention, the method includes the steps of:
  performing an information theoretic model predictive control applying a control trajectory sample prior in each time step to obtain a control trajectory for a given time horizon;
  determining the control trajectory sample prior depending on a data-driven trajectory prediction model which is trained to output a control trajectory sample as the control trajectory sample prior depending on an actual state of the robotic device.

In general, IT-MPC generates open-loop sequences of sampled controls by minimizing the Kullback-Leibler (KL) divergence between the current control distribution and the optimal one, derived by a desired cost function. Control samples for the IT-MPC are generated by a normal distribution centered around the previous control sequence. Therefore, this method performs well as long as the optimal control sequence only changes slightly from one step to the other.

However, if the optimal control sequence significantly changes, e.g., due to a new goal location or an unexpected appearance of a dynamic obstacle, the local sampling around the previous control sequence may lead to a poor convergence to the optimal control sequence. Therefore, the standard IT-MPC tends to be inappropriate for navigation of mobile robots in crowded environments.

Furthermore, the informed variant of theoretic model predictive control may iteratively evaluate a number of control trajectory samples derived from control trajectory sample prior based on a given distribution at each time step to obtain a further control trajectory sample, wherein the further control trajectory sample is determined depending on a combination of the number of weighted control trajectory samples, wherein the weights are determined based on the costs of each of the number of control trajectory samples.

In accordance with an example embodiment of the present invention, it may be provided that the data-driven trajectory prediction model comprises a neural network, particularly on the type of one of a soft actor-critic network, a trust region network, a policy optimization network, a proximal policy optimization network, a deep deterministic policy gradients network.

One approach to overcome above limitation of the poor convergence to the optimal control sequence is to use an informed sampling process by providing a predicted control trajectory as a control trajectory prior using a deep reinforcement learning algorithm. This may essentially comprise a data driven trajectory prediction model as machine-learning model which will generate a control trajectory prior based on a current state of the environment including a robot pose and poses of the detected obstacles, wherein a pose includes a position and an orientation of the robot or a part of the robot within the environment. The data driven trajectory prediction model is trained to estimate the control trajectory prior applying a training data set containing optimized control trajectories for different states of the environment. The optimized control trajectories may be provided by any kind of trajectory optimization processes for robotic devices in crowded environments. Sampling from this control trajectory prior distribution leads to an improved performance since fewer samples fall in costly parts of the state space.

In other words, one idea is to use an informed information-theoretic MPC approach for trajectory planning in crowded environments in combination with a deep reinforcement learning approach. The trajectory prediction model which is trained and is to apply a network that can generate robot control trajectories aware of the motions of surrounding dynamic objects and/or individuals.

In general, the above example method improves the information theoretic model predictive controlled technique for locally generating robot trajectories by considering a stochastic non-linear system in dynamic environments. The obtained trajectories are a result of the KL divergence minimization between the optimal sampling distribution and the actual one.

A robotic device as understood herein includes a mobile robot, such as an autonomous cleaning robot, an autonomous lawn mower or the like, as well as a robot having a movable manipulator, such as a robot arm, being configured to be moved within a given space.

A trajectory as understood herein is a planned path of a motion a robotic device may move along or a part of a robotic device, such as a manipulator, may be moved.

Particularly, the above method uses a data-driven prediction model that makes use of the potential of the IT-MPC framework.

Moreover, the control trajectory sample prior may be obtained by the modelled control trajectory sample obtained by trajectory prediction model and the control trajectory sample obtained in the last time step.

Particularly, the control trajectory sample prior may be obtained by the sum of the modelled control trajectory sample obtained by the trajectory prediction model and the control trajectory sample obtained in the last time step, particularly each weighted according to their trajectory costs according to a given cost function. The cost of a trajectory may be related to the expense to move along the trajectory in terms of energy, time, trajectory length and/or the like.

According to an example embodiment of the present invention, the modelled control trajectory sample may only be considered if the trajectory costs of the modelled control trajectory sample is higher than the trajectory costs of the control trajectory sample obtained in the last time step.

According to an aspect of the present invention, a control unit, such as a data processing device, for determining a control trajectory for a robotic device is provided. In accordance with an example embodiment of the present invention, the control unit is configured to perform the steps of:

performing an information theoretic model predictive control applying a control trajectory sample prior in each time step to obtain a control trajectory for a given time horizon;

determining the control trajectory sample prior depending on a data-driven trajectory prediction model which is trained to output a control trajectory sample as the control trajectory sample prior based on an actual state of the robotic device.

According to a further aspect of the present invention, a robotic device comprises an actuation unit being configured to move the robotic device according to a control trajectory; and a control unit. In accordance with an example embodiment of the present invention, the control unit is configured to perform the steps of:

performing an information theoretic model predictive control applying a control trajectory sample prior in each time step to obtain the control trajectory for a given time horizon;

determining the control trajectory sample prior depending on a data driven trajectory prediction model which is trained to output a control trajectory sample as the control trajectory sample prior based on an actual state of the robotic device.

BRIEF DESCRIPTION OF THE DRAWINGS

Example embodiments of the present invention are described in more detail below in conjunction with the figures.

BRIEF DESCRIPTION OF THE DRAWINGS

DETAILED DESCRIPTION OF EXAMPLE EMBODIMENTS

Figure 1:
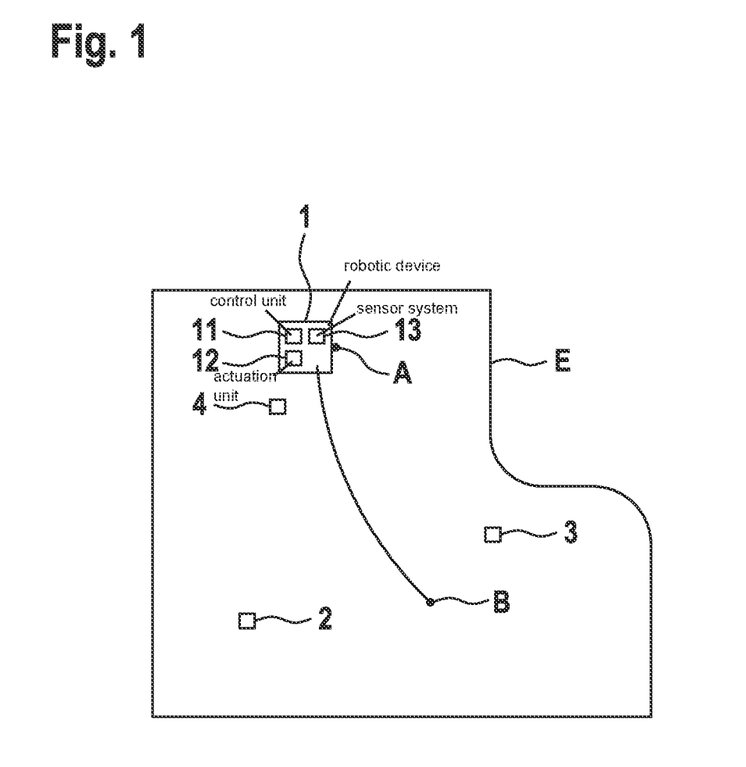
FIG. 1 shows a mobile robot in a crowded environment, in accordance with an example embodiment of the present invention.

FIG. 1 shows a system of a robotic device 1 as a mobile robot having a task to move through/within an environment E from position A to position B along a planned trajectory. In the environment E dynamic objects 2, 3, 4 may move performing their own tasks. The dynamic objects 2, 3, 4 may be further mobile robots or individuals each showing a kind of intelligent task driven behavior. The intelligent behavior of the dynamic objects 2, 3, 4 may follow a policy considering actions of the robotic device 1 and/or other dynamic objects 2, 3, 4.

The mobile robot may be an autonomous cleaning robot, an autonomous lawn mower, an autonomous service or care robot or the like. In other embodiments, the robotic device may be a robot with a manipulator, such as a robot arm, wherein the the manipulating device, such as a robot gripper, shall follow a planned trajectory.

The robotic device 1 may have a configuration as it is schematically shown in FIG. 1. The robotic device 1 has a control unit 11 that is configured to perform the subsequently described method and to control movement of the robotic device 1 along a planned trajectory among others.

The control unit 11 may have a microprocessor or a microcontroller as well as a memory for storing data and an algorithm code. Furthermore, the robotic device 1 has an actuation unit 12 for interaction with the environment, for instance the actuation unit 12 may include a traction motor for driving wheels of the robotic device 1 to move the robotic device 1 within the environment E. The actuation unit 12 may also include a controllable robot arm with a gripper or the like. The actuation unit 12 is controlled by the control unit 11.

Furthermore, the robotic device 1 may include a sensor system 13 for sensing the environment E, particularly to detect other objects and structures which may allow the localization of the robotic device 1 and of the dynamic objects 2, 3, 4 in the environment E such that their positions or their poses are known in the environment E. The sensor system 13 may include radar, Lidar, and/or imaging systems, such as one or more cameras to scan the environment E surrounding the robotic device 1.

When configuring such a robotic device 1, a control strategy has to be installed which allows the robotic device 1 to autonomously perform its task in the environment E. The control strategy should have implemented a collision avoidance/handling to prevent motion trajectories where a collision with another dynamic object is likely or to cope with collisions.

In simulation-based benchmarking of navigation algorithms for robotic devices, it is generally difficult to effectively model the behavior of the dynamic objects 2.

This behavior of each of the dynamic objects may contribute to or disturb the performing of the task of the robotic device 1.

Basically, in the control unit 11 of the robotic device 1, an informed information theoretic model predictive control (IT-MPC) approach is implemented and performed. The informed information theoretic model predictive control (IT-MPC) process considers stochastic non-linear discrete time systems of the form of $x_{t+1}=F(x_t, v_t)$, where $x_t \in \mathbb{R}^n$ is the system state at time t of dimension n. $v_t \in \mathbb{R}^m$ corresponds to the input control variable of dimension m with white noise obliged to nominal control $u_t$, i.e. $v_t=u_t+\varepsilon_t$ with $\varepsilon_t \sim \mathcal{N}(0,\Sigma)$, wherein $(v_0, v_1, \ldots, v_{t_f-1})=V \in \mathbb{R}^{m \times t_f}$ corresponds to the input sequence and $(u_0, u_1, \ldots, u_{t_f-1})=U \in \mathbb{R}^{m \times t_f}$ to the input with its disturbance $(\varepsilon_0, \varepsilon_1, \ldots, \varepsilon_{t_f-1})=\varepsilon$.

The goal of IT-MPC is to solve the stochastic optimal control problem of the form $$U^* \approx \underset{U \in \mathcal{U}}{\operatorname{argmin}} E_{\mathbb{Q}_{U,\Sigma}} \left( \sum_{t=0}^{t_f-1} c(x_t) + \phi(x_{t_f}) + \lambda u_{t-1}^T \sum^{-1} u_t \right)$$

where $\mathcal{U}$ is the set of possible input sequences for the system, $c(x_t)$ is a state-based cost, $\phi(x_{t_f})$ is a terminal cost and a rate $\lambda>0$. The optimal control distribution $\mathbb{Q}^*$ can be derived as $$q^*(V) = \frac{1}{\eta} \exp(-\frac{1}{\lambda} S(V) p(V|0, \Sigma)$$

where S(V) denotes the state cost of an entire trajectory, p may be a Gaussian with covariance $\Sigma$ and $\eta$ is a normalization factor. To approximate the above minimization problem, it is proposed to minimize the KL divergence between the optimal control distribution $\mathbb{Q}^*$ and $\mathbb{Q}_{U,\Sigma}$ $$U^* \approx \operatorname{argmin} \mathbb{D}_{KL}(\mathbb{Q}^*, \mathbb{Q}_{U,\Sigma})$$

In case the optimal control distribution is Gaussian, the approximation is correct, and the resulting control trajectory is optimal. Given samples $V_k$ around a nominal control trajectory $\hat{U}$ as described above with disturbances $\varepsilon_k$ above approximative minimization problem can be solved by an importance sampling scheme $$U^* \approx \hat{U} + \sum_{k=1}^{K} w_k \varepsilon_k$$

where $w_k$ are importance sampling weights. It is preferable to use above formula as an update rule in an iterative manner.

Figure 2:
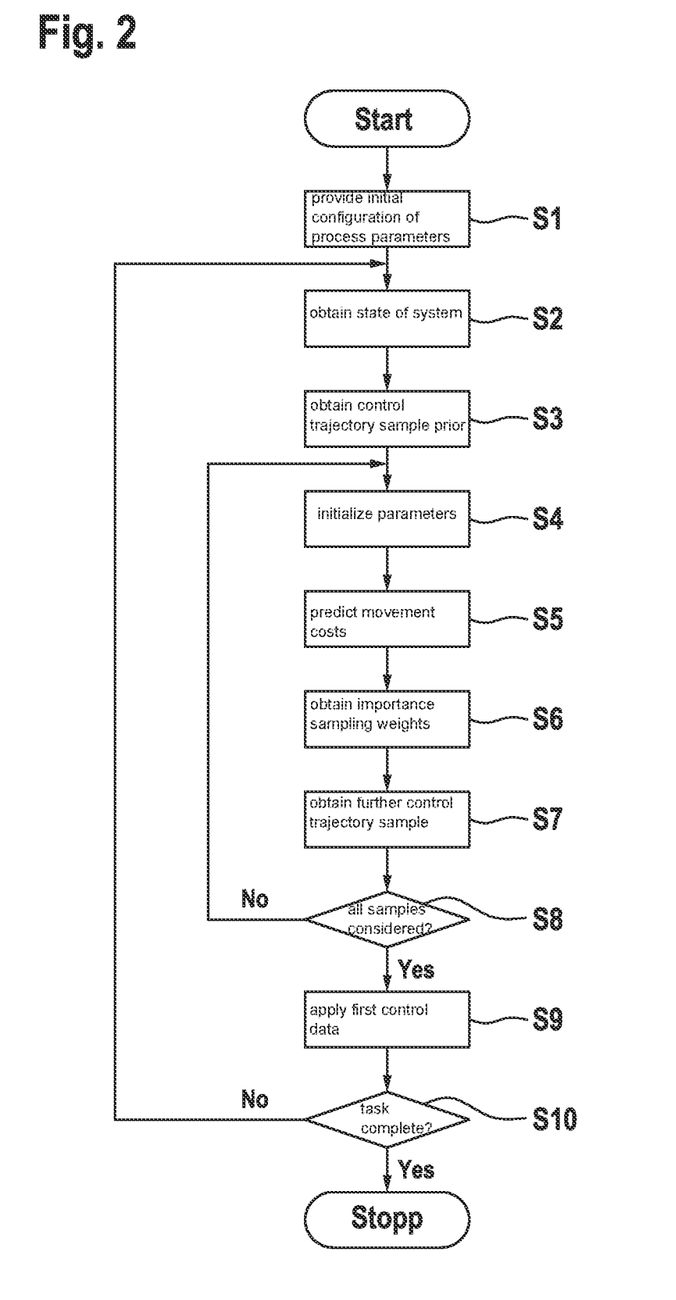
FIG. 2 shows a flowchart for an informed IT-MPC algorithm, in accordance with an example embodiment of the present invention.

A modified informed IT-MPC algorithm is described in conjunction with the flow chart of FIG. 2 and the pseudocode as follows:

| | Algorithm: Informed IT-MPC algorithm. |
|---|---|
| 1. | Input: u*: Initial control sequence, K: Number of samples, $t_f$: Time horizon, F: Transition model, $\phi$, c: State cost, $\Sigma$, $\lambda$: Hyper-parameter, C decoder conditions |
| 2. | While task not completer do |
| 3. |    $x_0 \leftarrow$ GetStateEstimate( ) |
| 4. |    U* $\leftarrow$ InformControls (x0, u*, C, $\Sigma$, $\phi$, c, F) |
| 5. |    for k $\leftarrow$ 0 to K-1 do |
| 6. |       x $\leftarrow$ x$_0$ |
| 7. |       S$_k$ $\leftarrow$ 0 |
| 8. |       $\varepsilon \leftarrow (\varepsilon_0^k, \ldots, \varepsilon_{t_f-1}^k), \varepsilon_t^k \in \mathcal{N}(0, \Sigma)$ |
| 9. |       For t $\leftarrow$ 1 to $t_f$ do |
| 10. |          x $\leftarrow$ F (x, u$_{t-1}$ + ($\varepsilon_{t-1}^k$)) |
| 11. |          $S_k \leftarrow S_k + c(x) + \lambda u_{t-1}^T \sum^{-1} \varepsilon_{t-1}^k$ |
| 12. |       end for |
| 13. |       $S_k \leftarrow S_k + \phi(x)$ |
| 14. |       $w_k \leftarrow$ ImportanceSamplingWeights($S_k$, $\lambda$) |
| 15. |       $U^* \leftarrow U^* + \sum_{k \leftarrow 1}^{K} w_k \varepsilon_k$ |
| 16. |    end for |
| 17. |    ApplyControl (u$_0^*$) |
| 18. |    For t $\leftarrow$ 1 to $t_f$ − 1 do |
| 19. |       u$_{t-1}^*$ $\leftarrow$ u$_t^*$ |
| 20. |    end for |
| 21. |    u$_{t_f-1}^*$ $\leftarrow$ Initialize(u$_{t_f-1}^*$) |
| 22. | End while |
| 23. | |

According to step S1 (line 1), an initial configuration of parameters of the process is given. So, u* indicates an initial control sequence, K a number of samples, $t_f$ a time horizon, F a transition model, $\phi$ terminal costs, c state costs, $\Sigma, \lambda$ hyper-parameters and C decoder conditions.

A control loop is started in step S2 which is performed between lines 2 to 22 of pseudocode of the Informed-IT-MPC algorithm which may be terminated once the goal state is reached by the robotic device 1.

In step S2 (line 3), the state of the system is obtained by the function "GetStateEstimate". The state of the system may be determined by processing sensor signals to obtain a pose of the robotic device 1 in/relative to the environment E and the poses and velocities of each of dynamic obstacles 2, 3, 4 in the environment E as well known in the art. Basically, this is accomplished by reading the sensor signals such as Lidar, radar and the like which are further processed to obtain the respective.

Figure 4:
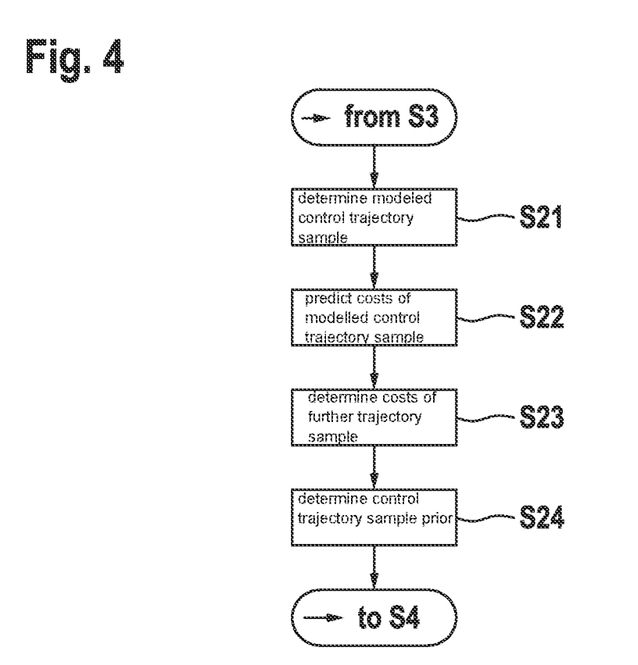
FIG. 4 shows a flow chart for the informed control function which generates a control trajectory sample prior based on a trained trajectory prediction model, in accordance with an example embodiment of the present invention.

In step S3 (line 4), a control trajectory sample prior is obtained by the algorithm "InformControls" which is described below in conjunction with FIG. 4.

Based on the control trajectory sample prior U*, a loop between lines 5 and 16 is performed for each of the samples k.

In step S4 (lines 6 to 8) x, $S_k$ and $\varepsilon_k$ are initialized.

In step S5, starting with the control trajectory prior U* as obtained in step S3, but in further iterations modified control trajectory prior U*, movement costs are predicted. This is performed by predicting future states of the system (line 10) with the time horizon $t_f$ and the corresponding movement costs $S_k$ are accumulated (line 11). The so obtained movement costs are added to the terminal costs $\phi(x)$ in line 13.

Figure 3:
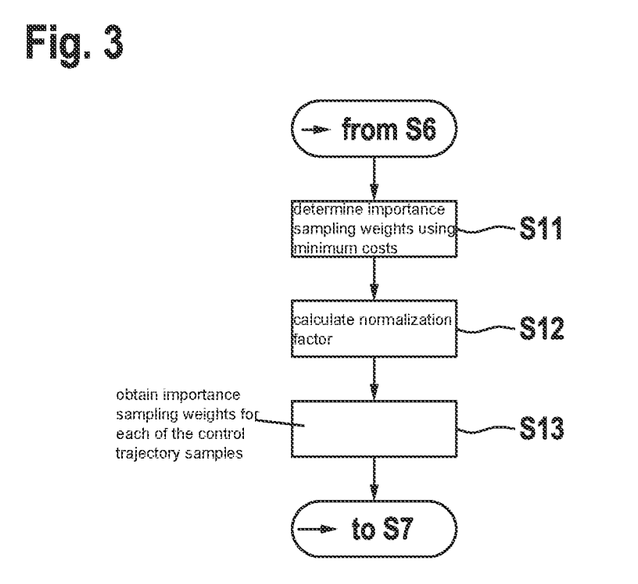
FIG. 3 shows a flowchart of a subroutine regarding the importance sampling weights function of the informed IT-MPC algorithm, in accordance with an example embodiment of the present invention.

In step S6 (line 14), importance sampling weights $w_k$ are obtained by an algorithm "ImportanceSamplingWeights" as shown in the flowchart of FIG. 3 and the following pseudocode:

| | Algorithm: ImportanceSamplingWeights ($S_k$, $\lambda$).. |
|---|---|
| 1: | Input: $S_k$, $\lambda$ |
| 2: | $\rho \leftarrow \min_k (S_k)$ |

-continued

Algorithm: ImportanceSamplingWeights ($S_k$, $\lambda$)..

3:
$$\eta \leftarrow \sum_{k=0}^{K-1} \exp\left(-\frac{1}{\lambda}(S_k - \rho)\right)$$

4:     for k ← 0 to K − 1 do

5:
$$w_k \leftarrow \frac{1}{\eta} \exp\left(-\frac{1}{\lambda}(S_k - \rho)\right)$$

6:     end for
7:     return $w_k$

The importance sampling weights $w_k$ are determined based on the accumulated trajectory costs $S_k$ of each control trajectory sample and the given $\lambda$.

The function to determine the importance sampling weights uses the minimum costs $\rho$ of all control trajectory samples considered so far in step S11 (line 2). In step S12 (line 3), a normalization factor $$\eta \leftarrow \sum_{k=0}^{K-1} \exp(-\frac{1}{\lambda}(S_k - \rho))$$

is calculated for making all movement costs of the considered samples comparable. In step S13 (lines 4 to 6), importance sampling weights $w_k$ for each of the control trajectory samples (determined so far) are obtained depending on a difference between the respective control trajectory costs $S_k$ and the minimum control trajectory costs over all samples. Loop of lines 4 and 6 is necessary, as only $S_k$ is needed.

Basically, the importance sampling weights $w_k$ are the higher, the higher the difference between the control trajectory sample costs and the minimum control trajectory sample costs $\rho$. The importance sampling weights $w_k$ for $S_k$ is returned to the Informed IT-MPC algorithm in line 7.

In step S7 (line15), based on the importance sampling weights $w_k$, a further control trajectory sample U* is obtained for the loop between lines 5 and 16.

In step S8 it is queried if all samples are considered. If positive (alternative: yes), the process is continued with step S9, otherwise (alternative: no) the process is continued with step S4.

In step S9 (line 17) of the informed IT-MPC algorithm, the first control data ($u*_0$) is applied to the robotic device 1. The predicted trajectory is updated to the following time step in step S10 (lines 18 to 20) so that ($u*_0$) is set to the former $U*_1$ and so on.

In step S10 it is queried if the task is completed. If positive (alternative: yes), the process is ended, otherwise (alternative: no) the process is continued with step S2.

In step S3 (line 4), a control trajectory sample prior is obtained by the algorithm which is described below in conjunction with FIG. 4 and the following pseudocode:

Algorithm InformControls (u*, $\sigma$, $\varphi_0$, $v_0$, $\Sigma$, $\phi$, q, F).

1:     Input: u*, $\sigma$, $\varphi_0$, $v_0$, $\Sigma$, $\phi$, q, F
2:     $\hat{u}$ = DeepReinforcementLearning ($\sigma$, $\varphi_0$, $v_0$)
3:     for t ← 1 to $t_f$ do
4:     $\hat{x}$ = F(x, g ($\hat{u}_{t-1}$))
5:     $\hat{S}_k = \hat{S}_k + c(\hat{x}) + \lambda \hat{u}_{t-1}^T \Sigma^{-1} \hat{u}_{t-1}$
6:     x* = F(x,g($u_{t-1}$*))

-continued

Algorithm InformControls (u*, $\sigma$, $\varphi_0$, $v_0$, $\Sigma$, $\phi$, q, F).

7:     $S_k^* = S_k^* + c(x^*) + \lambda u_{t-1}^{*T} \Sigma^{-1} u_{t-1}^*$
8:     end for
9:     $\hat{S} = \hat{S} + \emptyset(\hat{x})$
10:     S* = S* + $\emptyset$(x*)
11:     if $\hat{S}$ > S*then 12:
$$u^* = \left(1 - \frac{\hat{S}}{\hat{S} + \hat{S^*}}\right)\hat{u} + \left(1 - \frac{\hat{S}}{\hat{S} + \hat{S^*}}\right)u^*$$

13:     end if
14:     return u*

The control trajectory sample prior u* is generated based on the actual state of the system x, the trajectory control set of the last time step u*, initial conditions needed by the network, such as some sensor inputs $\sigma$, the robotic device 1 current state $\varphi_0$, $v_0$, a covariance metric $\Sigma$, terminal costs $\phi$, state costs c and the transition model F.

In step S21 (line 2), a modelled control trajectory sample $\hat{u}$ is determined based on a data-driven trajectory prediction model (function call: DeepReinforcementLearning ($\sigma$, $\varphi_0$, $v_0$)) which may be implemented as a machine learning model such as a neural network or the like. Inputs for the trajectory prediction model are $\sigma$, $\varphi_0$, $v_0$ indicating the actual state of the system including the pose of the robotic device 1 and a state of the environment E.

The neural network can use different types, such as soft actor-critic, trust region, policy optimization, proximal policy optimization, deep deterministic policy gradients or the like.

The trajectory prediction model is trained to generate the modelled control trajectory sample based on the actual state of the system and has been trained by optimized control trajectories. To obtain the optimized control trajectories classical deterministic MPC techniques can be used such as described in Schoels, T. et al., "An NMPC Approach using Convex Inner Approximations for Online Motion Planning with Guaranteed Collision Freedom", arXiv preprint arXiv: 1909.08267, 2019.

In step S22 along the given time horizon, based on the actual state of the system x, the costs $\hat{S}$ of the modelled control trajectory sample $\hat{u}$ predicted by the trajectory prediction model including the respective terminal costs at the end of the time horizon is determined (lines 4, 5 and 9)

In step S23 along the given time horizon, based on the actual state of the system x, the costs S* of the further trajectory control sample of the last time step u* including the respective terminal costs at the end of the time horizon is determined (lines 6, 7 and 10)

In step S24 (line 12), the control trajectory sample prior u* for returning to step S4 of the main algorithm Alg1 is determined by a combination of the modelled control trajectory u and the further trajectory control sample u* of the last time step as determined in step S7.

For instance, the returned control trajectory sample prior u* can be generated from the lastly generated further control trajectory sample u* and the modelled control trajectory sample $\hat{u}$. If the cost $\hat{S}$ of the modelled control trajectory sample $\hat{u}$ is higher than the costs S* of the lastly generated control trajectory sample u*, the returned control trajectory sample u* is generated according to line 12 based on a sum of the weighted control trajectories, wherein the weights are generated by the corresponding costs $\hat{S}$ and S*.

Otherwise the further control trajectory sample u* as determined by step S7 of the main algorithm is used for the following iteration.

The above algorithm aims to find a control trajectory distribution that minimizes the expected costs. The control trajectory distribution depends strongly on the cost function and on the prediction of the trajectory prediction model. The sampling-based approach is even more accurate, if the initial control trajectory sample distribution is already close to the optimal one. Instead of a naïve initialization such as a zero or constant velocity of the obstacles, the control trajectory sample distribution is guided towards low-cost areas of the state space. While using the data driven trajectory prediction model, control trajectory samples may be generated that optimize the original objective.

What is claimed is:

1. A computer-implemented method for determining a control trajectory for a robotic device, the method comprising the following steps:
   performing an information theoretic model predictive control applying a control trajectory sample prior in time steps to obtain the control trajectory for a given time horizon;
   determining the control trajectory sample prior depending on a data-driven trajectory prediction model which is trained to output a control trajectory sample as the control trajectory sample prior based on an actual state of the robotic device;
   wherein the control trajectory sample prior is obtained by a modelled control trajectory sample obtained using the trajectory prediction model and the control trajectory sample obtained in a last time step;
   wherein the control trajectory sample prior is obtained as a sum of the modelled control trajectory sample obtained by the trajectory prediction model and the control trajectory sample obtained in a last time step, each weighted according to their trajectory costs according to a given cost function;
   wherein the modelled control trajectory sample is only considered when the trajectory costs of the modelled control trajectory sample are higher than the trajectory costs of the control trajectory sample obtained in the last time step; and
   controlling the robotic device to act according to the determined control trajectory.

2. The method according to claim 1, wherein the information theoretic model predictive control iteratively evaluates a number of control trajectory samples derived from the control trajectory sample prior based on a given distribution at each time step to obtain a further control trajectory sample, wherein the further control trajectory sample is determined depending on a combination of a number of weighted control trajectory samples, and wherein weights of the weighted control trajectory samples are determined based on costs of each of the number of weighted control trajectory samples.

3. The method according to claim 1, wherein the data driven trajectory prediction model includes a machine learning mode, including a neural network, of a type of one of a soft actor-critic network, or a trust region network, or a policy optimization network, or a proximal policy optimization network, or a deep deterministic policy gradients network.

4. The method according to claim 1, wherein the robotic device is controlled to act according to the determined control trajectory.

5. A control unit configured to determining a control trajectory for a robotic device, the control unit configured to:
   perform an information theoretic model predictive control applying a control trajectory sample prior in time steps to obtain the control trajectory for a given time horizon;
   determine the control trajectory sample prior depending on a data driven trajectory prediction model which is trained to output a control trajectory sample as the control trajectory sample prior based on an actual state of the robotic device;
   wherein the control trajectory sample prior is obtained by a modelled control trajectory sample obtained using the trajectory prediction model and the control trajectory sample obtained in a last time step;
   wherein the control trajectory sample prior is obtained as a sum of the modelled control trajectory sample obtained by the trajectory prediction model and the control trajectory sample obtained in a last time step, each weighted according to their trajectory costs according to a given cost function;
   wherein the modelled control trajectory sample is only considered when the trajectory costs of the modelled control trajectory sample are higher than the trajectory costs of the control trajectory sample obtained in the last time step.

6. The control unit as recited in claim 5, wherein the control unit is a data processing device.

7. A robotic device, comprising:
   an actuation unit configured to move the robotic device according to a control trajectory;
   a control unit configured to:
      perform an information theoretic model predictive control applying a control trajectory sample prior in time steps to obtain the control trajectory for a given time horizon;
      determine the control trajectory sample prior depending on a data driven trajectory prediction model which is trained to output a control trajectory sample as the control trajectory sample prior based on an actual state of the robotic device;
   wherein the control trajectory sample prior is obtained by a modelled control trajectory sample obtained using the trajectory prediction model and the control trajectory sample obtained in a last time step;
   wherein the control trajectory sample prior is obtained as a sum of the modelled control trajectory sample obtained by the trajectory prediction model and the control trajectory sample obtained in the last time step, each weighted according to their trajectory costs according to a given cost function;
   wherein the modelled control trajectory sample is only considered when the trajectory costs of the modelled control trajectory sample are higher than the trajectory costs of the control trajectory sample obtained in the last time step.

8. A non-transitory machine readable medium on which are stored instructions for determining a control trajectory for a robotic device, the instructions, when executed by a computer, causing the computer to perform the following steps:
   performing an information theoretic model predictive control applying a control trajectory sample prior in time steps to obtain the control trajectory for a given time horizon;
   determining the control trajectory sample prior depending on a data-driven trajectory prediction model which is trained to output a control trajectory sample as the control trajectory sample prior based on an actual state of the robotic device;

wherein the control trajectory sample prior is obtained by a modelled control trajectory sample obtained using the trajectory prediction model and the control trajectory sample obtained in a last time step;

wherein the control trajectory sample prior is obtained as a sum of the modelled control trajectory sample obtained by the trajectory prediction model and the control trajectory sample obtained in a last time step, each weighted according to their trajectory costs according to a given cost function;

wherein the modelled control trajectory sample is only considered when the trajectory costs of the modelled control trajectory sample are higher than the trajectory costs of the control trajectory sample obtained in the last time step.

9. The control unit as recited in claim 5, wherein the control unit is further configured to control the robotic device to act according to the determined control trajectory.

10. The non-transitory machine readable medium as recited in claim 8, wherein the instructions, when executed by the computer, further cause the computer to perform the following step:

controlling the robotic device to act according to the determined control trajectory.

\* \* \* \* \*